Oct. 25, 1955  W. J. BROWN  2,721,968

MOTOR CONTROL SYSTEM

Filed Sept. 15, 1951  3 Sheets-Sheet 1

INVENTOR
WALTER J. BROWN.
BY James B. Grant
ATTORNEY

Oct. 25, 1955   W. J. BROWN   2,721,968
MOTOR CONTROL SYSTEM
Filed Sept. 15, 1951   3 Sheets-Sheet 3

INVENTOR
WALTER J. BROWN
BY James B. Grant
ATTORNEY

United States Patent Office 2,721,968
Patented Oct. 25, 1955

2,721,968

MOTOR CONTROL SYSTEM

Walter J. Brown, Stamford, Conn.

Application September 15, 1951, Serial No. 246,839

Claims priority, application Great Britain September 18, 1950

20 Claims. (Cl. 318—269)

This invention relates to electrical control systems for a controllable electric converter supplying power to an electric motor. The invention is more particularly concerned with such systems of the kind in which a signal voltage comprising the difference between a controlling voltage and a controlled voltage fed back from the motor is used to control the output of the converter.

When the converter comprises one or more space discharge devices for supplying power from A. C. mains to a D. C. electric motor, the signal voltage is applied to a control device, which may comprise a phase shifter, magnetic or thermionic amplifier or other convenient arrangement, by means of which the converter output is controlled by varying the phase and/or the magnitude of a voltage or voltages applied to a control electrode or electrodes of said space discharge device or devices.

In arrangements of the kind referred to, the controlling voltage is varied as required to adjust the speed of the motor and a change in the value of the controlling voltage in the direction to decrease the motor speed will so affect the signal voltage that the converter output is cut off, or very substantially reduced, whilst the motor coasts to a new lower speed at which the difference between the controlling and controlled voltages results in a signal voltage which brings the converter output to the value necessary to keep the motor running at the new speed.

It is frequently desirable, in practice, that the changes in the motor speed should be as rapid as possible, particularly where variations in motor speed are required in the course of a cycle of operations of apparatus driven by the motor. The time taken by the motor to slow down during speed reduction is then excessive and it has been proposed to provide means for effecting dynamic braking of the motor when rectifier means, constituting the converter, are temporarily inoperative due to a rapid adjustment of the control circuit toward a lower value of motor speed.

An object of the present invention is to provide in a system of the kind referred to, a dynamic braking arrangement which is rendered operative in dependence on the condition of the motor itself and which does not depend on whether or not the converter is operative and which does not rely for bringing the braking into operation on means responsive to the current supplied from the converter to the motor. A further object of the invention is to provide a simple and inexpensive dynamic braking arrangement which is rendered operative by a light current relay or relays and is particularly sensitive in operation.

A further object of the invention is to provide an arrangement for quickly and accurately lowering the speed of the motor, upon reduction of the controlling voltage to a lower value, without either undershooting or overshooting of the motor speed.

A further object of the invention is to provide compensating means whereby it is possible to brake the motor rapidly and precisely from one speed to another lower speed, the dynamic braking being removed when the motor actually reaches the lower speed. This is an important practical advantage which results in considerable saving of time when the motor is driving apparatus operating on a cycle requiring frequent speed reduction.

A further object of the invention is to combine the compensated arrangement for rapidly and precisely lowering the motor speed, with a current-limited accelerating circuit for rapidly and precisely raising the speed, so that a complete cycle or program of speed changes, both upwards and downwards, may be completed with a minimum of time wastage during speed changes.

According to the present invention an electrical control system of the kind referred to and in which the controlled voltage fed back from the motor is dependent on the voltage across the motor armature, has a relay which, when it operates causes dynamic braking of the motor, so connected in the signal circuit that such relay operates when there is a sudden reduction in the controlling voltage. Preferably the arrangement is such that the signal voltage causes the relay to return to its inoperative position to release the braking when the motor speed has dropped approximately to that corresponding to the reduced value of the controlling voltage.

If the controlled voltage were derived from a feedback potential divider connected across the armature alone, the relay would operate to disconnect the dynamic braking resistor as soon as the controlled voltage had dropped to a value approximately corresponding to the reduced value of the controlling voltage. Since however the controlled voltage would depend only on the armature voltage, the controlled voltage under braking conditions would be less than it should be in order to be directly dependent on the back E. M. F. of the armature (which is dependent on the motor speed) because of the voltage drop in the armature due to the braking current flowing through its internal resistance. The relay would therefore operate to disconnect the braking resistor prematurely, that is before the motor had slowed down sufficiently, and the time of speed changing would be increased while the motor coasted down to the required speed.

In the preferred arrangement, the controlled voltage is compensated for the voltage drop in the internal resistance of the armature due to the dynamic braking current flowing therein, whereby the controlled voltage fed back is directly representative of the back E. M. F. of the armature and therefore of the true motor speed.

In this preferred arrangement, according to this invention, the controlled voltage fed back is derived from a potential divider which is connected across the armature and across at least a part of a resistor which is in series with the armature and with the braking resistor. Alternatively, the potential divider may be connected across the armature and across a part of the braking resistor itself.

The voltage drop in the series resistor, or in the part of the braking resistor due to the braking current, is in the same direction as the voltage across the feedback potential divider. The two voltages will thus be additive and the motor speed will have to drop to a lower value than would otherwise be the case, so that the part of the controlled voltage which is due to the voltage drop in the series resistor, or in the part of the dynamic braking resistor, tends to compensate for the reduction in armature voltage due to the voltage drop in the armature internal resistance caused by the braking current.

During regular operation the converter power may be supplied directly to the armature terminal or alternatively it may be supplied to the armature through the whole or a part of the series resistor, or through a part of the dynamic braking resistor, in order to provide either partial or complete compensation for the voltage drop in the motor armature internal resistance due to its load current during regular operation, when the converter is supplying power to the motor. This alternative connection is convenient when the motor is of low power, so that there is not an excessive power loss in the series resistor during regular operation, but it is not desirable for large motors where the power loss in the series resistor would be excessive.

The dynamic braking relay may be connected in the signal circuit in one of several alternative ways, according to the nature of the control device. When the control device includes a control winding in the signal circuit which when energized by a signal current increases the converter output, the relay coil may be connected in series with said control winding and with a rectifier to prevent reversal of the signal current. When the control device includes a vacuum tube having control electrodes energized by a signal voltage, the relay coil may be connected, in series with a rectifier, across said control electrodes. Alternatively, the rectifier may be eliminated in either of these arrangements, by using a polarized relay. Alternatively, when the control device includes a vacuum tube, the relay coil may be connected in the plate circuit of said vacuum tube and, since the vacuum tube will only conduct in one direction, it acts as a rectifier and no additional rectifier is required.

In any of these arrangements, the connections are such that a sudden reduction of controlling voltage causes the relay to operate in such a manner as to connect a dynamic braking resistor across the armature.

The invention will now be described in detail with reference to the following drawings.

Figure 1:
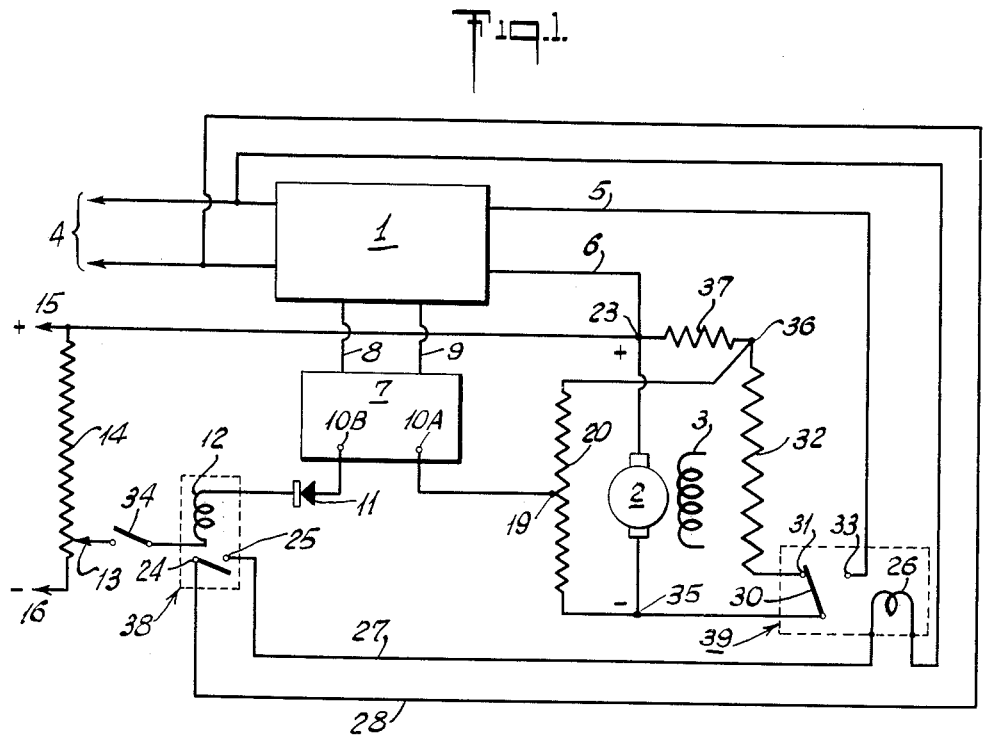
Figure 1 is a schematic circuit diagram of the invention.

Referring to Figure 1, numeral 1 designates a controllable electric converter for supplying power to the armature 2 of an electric motor which also has a field winding 3 which is energized from a source not shown. The converter derives its power input from the mains 4 and delivers a D. C. or asymmetric power output to armature 2 through conductors 5 and 6, having the polarities shown.

The converter power output is controlled by the control device 7, which is connected to the converter 1 through conductors 8 and 9. The control device is provided with control terminals 10A and 10B which are connected in a signal circuit which includes dry disc rectifier 11, relay coil 12, and switch 34, all of which are connected in series between the tapping 19 on potential divider 20 and the adjustable tapping 13 on the potentiometer 14. The potentiometer 14 is supplied with a D. C. or asymmetric voltage through conductors 15, 16 having positive and negative polarities respectively, from a source not shown. The positive end 22 of the potentiometer 14 is connected by conductor 21 to the positive armature terminal 23 and accordingly a controlling or reference voltage is established between armature terminal 23 and tapping 13.

The potential divider 20 is connected between the negative armature terminal 35 and a terminal 36 which is connected through a heavy-current series resistor 37 to the armature terminal 23, and a controlled or feedback voltage is established between terminal 23 and tapping 19. The tapping 19 is of negative polarity with respect to terminal 23 and the difference between the controlling and controlled voltages is therefore applied as a relatively small D. C. or asymmetric signal voltage to the signal circuit comprising the control terminals 10A, 10B, the rectifier 11, the relay winding 12 and the switch 34.

During normal operation the controlling voltage is adjusted by means of tapping 13 to the value corresponding to the speed at which the motor is to run and the motor will speed up until the controlled voltage between terminals 23 and 19 reaches a value slightly less than the controlling voltage between terminals 23 and 13, such that the signal voltage causes the current flowing from right to left in the signal circuit to be that needed for the converter 1 to give the required output. At the same time the relay winding 12 is energized.

The winding 12 is the operating coil of a sensitive dynamic braking relay 38 which is provided with contacts 24, 25 which are "normally open," that is to say, they are open when the relay winding 12 is de-energized and they only close when the relay winding is energized. A dynamic braking contactor 39 is also provided, having a winding 26 which is connected in series with the relay contacts 24 and 25, across a suitable electrical source such as the supply mains 4, through conductors 27 and 28. The contactor is provided with heavy-current contacts 30 and 31, which are "normally closed" (when the contactor winding 26 is de-energized), and which connect a heavy-current dynamic braking resistor 32 across the armature 2 in series with resistor 37. A further contact 33 is also preferably provided on the contactor 39, which is "normally open" and is connected to the convertor output conductor 5, and which is arranged to connect conductor 5 to contact 30 and to armature terminal 35 when the contactor is energized. Alternatively, the contact 33 may be omitted and the conductor 5 connected directly to the contact 30.

During regular operation when the winding 12 of the dynamic braking relay 38 is energized as described above, its contacts 24, 25 are closed, thus energizing the winding 26 of the dynamic braking contactor 39 and consequently opening the contacts 30, 31 and closing the contacts 30 and 33; accordingly the armature is disconnected from the dynamic braking resistor 32 and is connected to the converter output through conductor 5.

If now in order to reduce the speed of the motor the controlling voltage between 23 and 13 is suddenly reduced to less than the controlled voltage between 23 and 19, by moving the tapping 13 upwards, the direction of current flow in the signal voltage circuit 19, 10A, 10B, 11, 12, 34, 13, tends to reverse; owing to the rectifier 11 in the circuit, reverse current cannot flow and accordingly the winding 12 of the braking relay 38 is de-energized thus opening its contacts 24, 25 and de-energizing the winding 26 of the dynamic braking contactor 39; contacts 30 and 31 are thereby closed, thus connecting the dynamic braking resistor 32 across the armature 2 and the series resistor 37; at the same time, contacts 30 and 33 are opened, thus disconnecting the armature 2 from the converter output conductor 5. Also the change in signal voltage and the resulting reduction to zero of the current flow in the signal circuit 19, 10A, 10B, 11, 12, 34, 13 will reduce the output of the converter 1 to a low value or to zero but the dynamic braking becomes effective immediately irrespective of the converter or of the rate at which it is shut down. The same sequence of operations can alternatively be produced by opening the switch 34. When the characteristics of the converter control device 7 are such that the output of converter 1 is cut off before the signal voltage drops to zero, i. e. before the controlled voltage exceeds the controlling voltage, the relay will be so designed that its contacts 24, 25 open to initiate braking when there is an appropriate reduction in the controlling voltage even though there may still be an appreciable current through its winding 12. The operating characteristics of the braking relay will naturally be such that it does not de-energize or "chatter" when there are variations in the signal voltage to correct normal small fluctuations in the motor speed due to small load variations or fluctuations in the supply voltage to the converter. It will be noted, however, that under certain conditions in the event of a sudden large reduction in the motor load, the consequent sudden increase in the motor speed before the converter output is reduced may bring the dynamic braking into operation because the increase in motor speed may cause the controlled voltage to increase sufficiently for the braking relay to de-energize.

In the case of small fractional horsepower motors, it is sometimes possible to omit the braking contactor and to provide the relay 38 with "normally open" contacts for connecting the braking resistor 32 when the relay is de-energized. In the case of large motors, on the other hand, the contactor winding 26 may require more current than can be safely carried by the contacts 24, 25 of the sensitive relay, and it may be necessary to provide an intermediate relay as will be described with reference to Fig. 2.

The purpose of the series resistor 37 is to compensate the controlled voltage for the voltage drop in the internal resistance of the armature when a dynamic braking current flows therein, so that the controlled voltage fed back between the terminal 36 and the tapping 19 during braking is approximately representative of the back E. M. F. of the armature and therefore of the true motor speed. Accordingly, when it is desired to lower the motor speed by reducing the controlling voltage between terminal 23 and tapping 13 to a new value, the relay winding 12 is re-energized only after the motor speed has dropped to a value corresponding to the new value of the controlling voltage.

The effect of the voltage drop in the internal resistance of the armature, due to the braking current is to make the potential of its negative terminal 35 less negative with respect to terminal 23 than that which would be due to the back E. M. F. alone; the effect of the voltage drop in resistor 37, due to the braking current, is to make the potential of terminal 36 more negative with respect to terminal 23. Since the potential divider 20 is connected between the terminals 36 and 35, the potential of its tapping 19 may be made to be independent of said voltage drops, and therefore dependent only on the armature back E. M. F., by choosing an appropriate ohmic value for the resistor 37. The detailed calculations for this are described later with reference to Figure 4.

The control terminals 10A and 10B of Fig. 1 are the signal terminals of any suitable control device such as the D. C. control terminals of a saturable reactor or transductor combination which has additional windings embodied in a phase-shifting network or in a magnetic amplifier; alternatively the control terminals 10A and 10B may be connected to the control electrodes of a vacuum tube, as shown for instance in Figs. 5 and 6.

Figure 2:
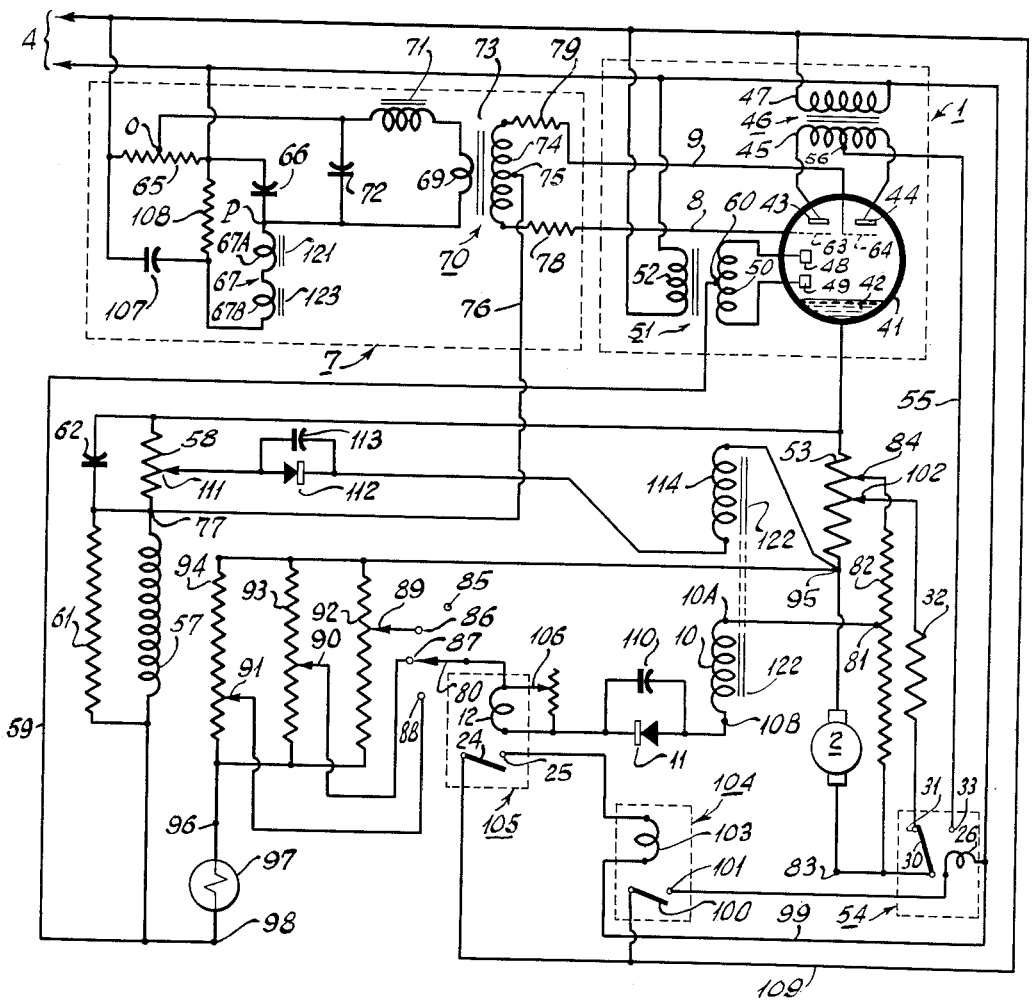
Figure 2 is a practical circuit diagram of one form of the invention.

Fig. 2 shows a complete system in which the controlled voltage is compensated so as to be directly representative of the back E. M. F. of the armature during braking conditions, as just described, and also during regular operation when the converter 1 is supplying power to the motor armature 2; the same reference numerals are used for some of the components of Fig. 2 as were used in Fig. 1.

The dotted rectangle 1 is a controllable electric converter comprising a mercury arc rectifier 41 having a mercury pool cathode 42 and two main anodes 43, 44 which are supplied with A. C. power from secondary winding 45 of transformer 46, the primary 47 of which is connected to the A. C. input mains 4. Two auxiliary anodes 48, 49 are also provided, and are supplied with A. C. power from the secondary 50 of transformer 51, the primary 52 of which is connected to the A. C. mains 4. The usual starting and excitation anodes and circuits are also provided but are omitted from the drawing for simplicity. The positive terminal 95 of the motor armature 2 is connected through the heavy-current series resistor 53 to cathode 42, and the negative armature terminal 83 is connected through the contacts 30 and 33 of contactor 54 and through conductor 55 to the center tap 56 on transformer secondary 45.

The motor field winding 57 is connected through series resistor 58 to cathode 42, and through conductor 59 to center tap 60 of transformer secondary 50. A field discharge resistor 61 is connected across the field winding 57 and a filter condenser 62 is connected across resistor 58. The main anodes 43, 44 are associated with control grids 63, 64 for controlling their ignition time and the grids are connected through conductors 8, 9 to the control device 7. The control device 7 comprises a phase shifting network of the type described in U. S. Patent 2,524,762 with reference to Figs. 1 and 2; this is used for the purpose of illustration and the details of said network are not a part of the present invention. The phase shifting network includes a condenser 107 and resistor 108 connected across the A. C. main 4, and a resistor 65 also connected across the mains 4 and having a center tap 0 which forms an output terminal of the phase shifting network. A condenser 66 and an inductor 67 are connected across resistor 108 through a common terminal P which forms the other output terminal of the phase shifter. The inductance 67 comprises in this instance the two serially connected A. C. windings 67A and 67B of a saturable reactor which are mounted on the outer two legs 121, 123 of a three leg magnetic core, arranged so that their combined inductance can be varied by applying a D. C. or asymmetric voltage to a control winding 10 which is mounted on the central leg 122 of said core, and is connected between terminals 10A and 10B. Providing the circuit constants of the phase-shifting network are proportioned as described in the aforementioned U. S. Patent 2,524,762, a variation in the value of the inductance 67 will create a phase shift in the voltage at the terminals OP, while the amplitude of the voltage OP will remain substantially constant; however the adjustment of the circuit for constant amplitude should be made after connection of the grid peaking circuit to be described and, indeed, it is not necessary that the amplitude should remain constant, but only that it should always exceed a predetermined minimum value.

A grid peaking circuit is connected to the output terminals OP of the phase shifter, and comprises the primary 69 of a peaking transformer 70, connected in series with a resonating reactor 71 across terminals OP, and also a resonating condenser 72 connected across OP. The peaking transformer 70 has a core 73 of high permeability and low loss, such as a laminated core of nickel-iron-alloy and the primary winding 69 has a relatively small number of turns so that the core is saturated with a relatively small primary voltage. The resonating reactor 71 and condenser 72 are tuned so that the circuit 69, 71, 72 resonates approximately at the A. C. mains frequency and so that the current flowing around said circuit is considerably greater than the current delivered from the output terminals OP of the phase shifter; the arrangement is such that the core 73 is well saturated during the major part of each half cycle of current in the primary 69, and accordingly the flux in the core changes direction very rapidly at the instants when the primary current is changing from positive to negative and vice versa—in other words, at two instants during each cycle. A secondary winding 74 is provided, having a large number of turns so that a high peak voltage is developed at the instants when the flux rapidly changes direction and the winding 74 has a center tap 75 which is connected through conductor 76 to terminal 77 which is negative with respect to cathode 42. The ends of secondary winding 74 are connected to the grids 63, 64, through limiting resistors 78, 79 and conductors 8, 9. Accordingly, the grids 63, 64 are normally biased negatively by the voltage across resistor 58, but alternative positive and negative peak voltages are applied, in phase opposition, to the grids 63, 64 at the end of each half cycle of the circulating alternating current in the resonant circuit 69, 71, 72 and the positive peaks initiate the firing of the corresponding anodes 43 and 44. Accordingly the firing time or ignition angle of said anodes may be controlled by controlling the phase angle of the voltage OP in relation to the anode voltage and said phase angle is in turn controlled by varying the inductance 67 which is dependent upon the D. C. or asymmetric signal voltage applied to the control winding 10. The control winding 10 is connected in a signal circuit in series with the dry disc rectifier 11 and with the winding 12 of relay 105, between a source of controlling voltage derived from the switch arm 80, and a source of controlled voltage derived from the tapping 81 on the potential divider 82 which is connected to the negative terminal 83 of armature 2, and to a tapping 84 on the series resistor 53. The controlling voltage is selected by the switch arm 80 from any one of the switch studs 85, 86, 87 or 88. The stud 85 is isolated and therefore delivers no controlling voltage. The studs 86, 87, 88 are connected respectively to tappings 89, 90, 91 on the potentiometers 92, 93, 94 which are connected in parallel between the positive terminal 95 of the armature 2, and the positive terminal 96 of the barreter or ballast tube 97, the negative terminal 98 of which is connected through conductor 59 to the center tap 60 of transformer secondary 50. The barreter 97 regulates the current flowing through it so that it is substantially constant, regardless of variations in the voltage across it and it accordingly maintains a substantially constant current, and therefore a substantially constant voltage drop in each of the potentiometers 92, 93 and 94, thus maintaining substantially constant the alternative controlling voltages which may be selected by switch arm 80. For example when the switch arm 80 is in contact with stud 87 as shown in Fig. 2, a substantially constant unidirectonal controlling voltage is derived between the tapping 90 on potentiometer 93 and the positive armature terminal 95, the tapping 90 being of negative polarity with reference to terminal 95. During regular operation of the motor, the tapping 84 is of positive polarity in relation to terminal 95 and the voltage drop in the portion of resistor 53 between terminal 95 and tapping 84 is a controlled voltage which is added to said controlling voltage, while the further controlled voltage between tappings 84 and 81 is of opposite polarity and is subtracted from the sum of the previous two voltages and the difference is applied as a signal voltage to the signal circuit comprising the control winding 10, the rectifier 11, and the relay winding 12. The converter then delivers sufficient output to maintain the resultant controlled voltage between terminals 95 and 81 at a value which is slightly less than the controlling voltage between terminals 95 and 90. The tapping 84 may be adjusted to such a position on resistor 53 that the motor speed is maintained substantially constant, regardless of its load, since any increase in load current will increase the voltage drop between terminals 84 and 95 and the converter output will be increased until the voltage between terminals 84 and 81 has also increased so that the signal voltage between terminals 81 and 90 has been restored approximately to its original value.

During regular operation the current in the signal circuit 10, 11, 12 flows from right to left in Fig. 2 and energizes the relay winding 12 of relay 105 and closes its contacts 24 and 25. This completes a circuit from A. C. mains 4 through conductor 109, contacts 24, 25, winding 103 of intermediate relay 104 and conductor 99, thus energizing the intermediate relay 104 and closing its contacts 100, 101. A circuit is therefore completed from A. C. mains 4 through conductor 109, contacts 100, 101 and winding 26 of contactor 54, thus closing contacts 30 and 33 and connecting the armature negative terminal 83 to the output conductor 55 of converter 1. At the same time the contacts 30, 31 are held open, thus removing the dynamic braking resistor 32 from the circuit.

If the switch arm 80 is now moved to another stud such as 86 at which a smaller negative controlling voltage exists, the signal voltage between terminals 80 and 81 will reverse, terminal 80 becoming the more positive and, accordingly, the rectifier 11 will cease to conduct, the current in the signal circuit 12, 11, 10 will fall to zero and the relay winding 12 will be de-energized. Accordingly, the contacts 24, 25 will be opened thus de-energizing the intermediate relay 104 and opening its contacts 100, 101 and in turn deenergizing the contactor 54. This will open contacts 30 and 33 so as to disconnect the motor armature from the converter output and will close contacts 30 and 31 so as to connect the dynamic braking resistor 32 between the negative armature terminal 83 and the tapping 102 on the series resistor 53. A dynamic braking current will then flow from the positive armature terminal 95, through series resistor 53 to tapping 102 and thence through braking resistor 32 and contacts 31, 30 to the negative armature terminal 83.

Owing to the internal resistance of the armature, the voltage between its terminals 95 and 83 will be less than its back E. M. F., so that the potential at its negative terminal 83 is less negative with respect to terminal 95 than it would be if the full back E. M. F. of the armature could appear at terminal 83; for this reason the potential of the tapping 81 tends to be less negative than it should be, so that a signal current would commence to flow from right to left through the circuit 10, 11, 12, before the motor speed had been reduced to that which corresponds to the new value of controlling voltage at tapping 89; thus the relay winding 12 would be prematurely re-energized to remove the dynamic braking resistor and reconnect the armature to the converter and furthermore, the converter would be prematurely re-energized by the signal current flowing in the control winding 10.

However, this effect is compensated for in Fig. 2 by reason of the fact that the braking resistor 32 is connected across a part of the series resistor 53 as well as across the armature 2. The voltage drop in the series resistor 53 due to the braking current is in such a direction that the tapping 84 is negative with respect to terminal 95, and this causes the potential of tapping 81 to be more negative than it would otherwise be, so that the motor speed will have to drop to a lower value than would otherwise be the case, before the signal current in circuit 10, 11, 12 is restored and the braking removed. By suitably adjusting the position of tappings 102 and 84 on resistor 53 it may be arranged that the signal current re-energizes relay winding 12 to remove the dynamic braking only when the motor speed has dropped sufficiently for its back E. M. F. to be of such a value as to correspond with the new controlling voltage selected by switch arm 80, at which speed the motor will thereafter continue to run without appreciable further change of speed. This is further explained with reference to Fig. 4

Theoretically, if both the control device 7 and the dynamic braking relay 105 were infinitely sensitive, the tapping points 102 and 84 and 102 might be coincident but two separate tapping points have been shown in Fig. 2 so that separate adjustments can be made of the dynamic braking compensation and of the speed regulation of the motor.

In order to make the operation of rectifier 11 more definite and to cut off the signal current more steeply when the signal voltage across the circuit 10, 11, 12 is reversed a condenser 110 is preferably connected across the rectifier to reduce any ripple voltages. Also in order to provide a means for adjusting the conditions under which the dynamic braking is applied and removed, a resistor 106 is preferably connected across relay winding 12 in order to adjust its sensitivity.

In the arrangement of Fig. 2 the output of the converter 1 is controlled at all times by the signal current flowing through the control winding 10. Accordingly, when the switch arm 80 is moved to a position to reduce the controlling voltage and the signal voltage across circuit 10, 11, 12 reverses, so that the current in the signal circuit falls to zero, the output of the converter is reduced to a low value or to zero as may be predetermined by the design of the control device 7. Also, when the motor speed has fallen to the desired new value and the current has been restored in the signal circuit 10, 11, 12, this signal current restores the converter output and thereafter maintains the appropriate output to continue driving the motor at the new speed.

If the control device 7 is designed to reduce the converter output quickly to zero when the signal current is removed, and if it is also designed so as not to restore any substantial converter output upon reapplication of the signal current until after the signal current has re-energized the braking relay 12 and disconnected the braking resistor 32, the contact 33 may be omitted from contactor 54 and the converter output conductor 55 may be connected directly to the armature negative terminal 83.

If the switch arm 80 is moved to the off position 85, the controlling voltage is entirely removed, so that contactor 54 permanently disconnects the armature from the converter output and connects it to the braking resistor 32, and also the converter output is reduced to its minimum value or to zero.

If the switch arm 80 is moved to a position at which the negative controlling voltage is increased, for instance if it is moved from stud 87 to stud 88, the signal voltage across the circuit 10, 11, 12 is increased thus increasing the current in control winding 10 and increasing the converter output and accelerating the motor to a higher speed, at which its back E. M. F. will correspond to the new value of controlling voltage. In order to limit the converter output to a safe value during such acceleration, a current limiting circuit is provided of a kind which is described in U. S. patent applications Nos. 110,812, 110,813 and U. S. Patent No. 2,554,695. The current-limiting circuit is illustrated for the purpose of describing a complete system in which rapid speed changes can be made either up or down, and the details of the current-limiting circuit do not form a part of the present invention.

The current-limiting circuit comprises a source of current limit controlling voltage derived from resistor 58 between cathode terminal 42 and tapping 111, a rectifier 112 shunted by a condenser 113, and an additional control winding 114 on the center leg 122 of the saturable reactor core upon which the winding 10 is also wound. The arrangement is such that a controlled voltage proportioned to the load current in the armature is developed in resistor 53 between its terminals 42, 95 and is applied in opposition to the controlling voltage between terminals 42, 111, to the control winding 114 through the rectifier 112. Under regular conditions of operation, the controlled voltage is less than the controlling voltage and no current is passed by the rectifier 112. However, if the armature load current during acceleration should increase until the controlled voltage across resistor 53 exceeds the controlling voltage between terminals 42, 111, the rectifier 112 will conduct and will allow current to flow through the control winding 114 which is connected with such polarity as to oppose the magnetization due to control winding 10 and thus tend to reduce the output of the converter 1, and to limit any further substantial rise in armature load current.

Figures 3, 4:
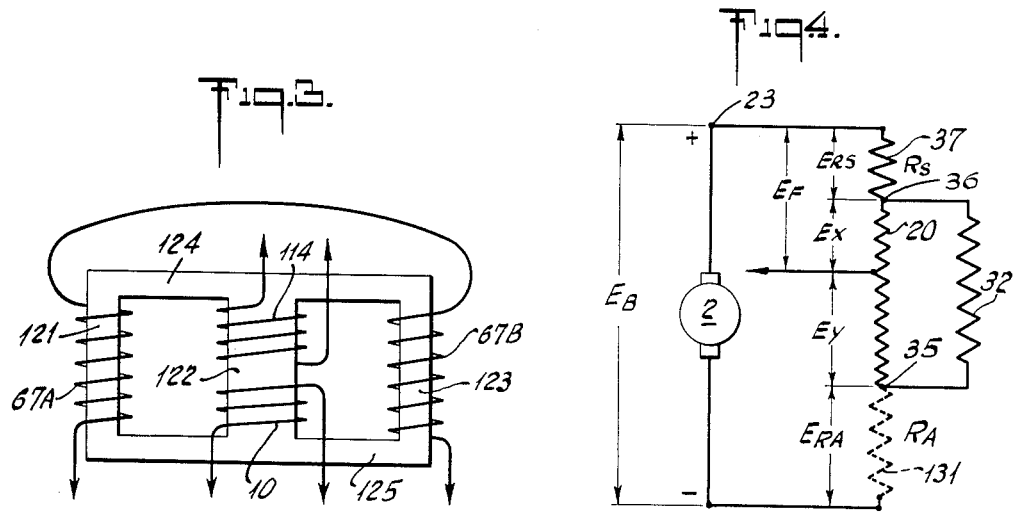
Figure 3 is a detailed diagram of a part of Figure 2.
Figure 4 is a schematic diagram illustrating the principles of operation of the circuits of Figures 1 and 2.

Fig. 3 shows the details of the saturable reactor which forms part of the control device 7 in Fig. 2. This includes a laminated magnetic core preferably of nickel-iron alloy, having three legs 121, 122 and 123, connected together at their upper ends by the yoke 124 and at their lower ends by yoke 125.

Coils 67A and 67B are wound on the outer legs 121 and 123 and are connected in series with the polarity shown and these coils together form the inductance 67 of Fig. 2. The D. C. control windings 10 and 114 are mounted on the central leg 122 of the core and are polarized as described with reference to Fig. 2. When a D. C. or asymmetric control signal is applied to winding 10, the asymmetric flux tends to saturate the outer legs 121, 123 of the core and to reduce the combined inductance of coils 67A and 67B. When, however, a D. C. or asymmetric control signal of opposite polarity is applied to winding 114 this tends to neutralize the effect of the current of the winding 10 and thus to reduce the degree of saturation and increase the inductance of coils 67A and 67B.

Fig. 4 illustrates the theory of operation of the series resistor 37 of Fig. 1 in compensating the controlled voltage during dynamic braking whereby the controlled voltage fed back during the braking operation is directly representative of the back E. M. F. of the armature and therefore of the true motor speed. For simplicity, Fig. 4 has been drawn to show the relative D. C. voltage conditions during dynamic braking with positive voltages increasing upwards, towards the top of the drawing. The armature 2 is shown as developing its full back E. M. F. $E_B$.

The internal resistance $R_A$ of the armature is shown in dotted lines as a resistance 131 and the voltage drop across this internal resistance as $E_{RA}$. Thus the actual terminal voltage of the motor armature is the voltage between terminal 23 and the terminal 35, and is equal to $E_B - E_{RA}$. The series resistor 37 is connected between terminal 23 and terminal 36. The dynamic braking resistor 32 is connected between terminals 36 and 35. The feedback potential divider 20 is connected between terminals 36 and 35 and carries the tapping 19, the controlled voltage or feedback voltage $E_F$ being developed between terminal 23 and tapping 19 as described with reference to Fig. 1. The voltage drop across the series resistor 37 is denoted by $E_{RS}$, and the voltages across the upper and lower sections of the potential divider 20 are denoted by $E_x$ and $E_y$ respectively. The ohmic value of resistor 37 is denoted as $R_S$ and is adjusted so as to equal $$\frac{1}{n}$$

of the internal armature resistance $R_A$, where $n$ is the ratio of the potential divider $$\frac{E_y}{E_x}$$

Then the controlled or feedback voltage $E_f$ is equal to $$\frac{1}{1+n}$$

of the back E. M. F., $E_b$, regardless of the value of the braking current.

For $$\frac{E_F}{E_B} = \frac{(E_{rs} + E_x)}{(E_{RS} + E_x) + (E_{RA} + E_y)}$$

But $$R_S = \frac{R_A}{n}$$

and therefore $$E_{RS} = \frac{E_{RA}}{n}$$

since the same current flows in $R_S$ and $R_A$. Also $$E_x = \frac{E_y}{n}$$

Therefore $$\frac{E_F}{E_B} = \frac{\left(\frac{E_{RA}}{n} + \frac{E_y}{n}\right)}{\left(\frac{E_{RA}}{n} + \frac{E_y}{n}\right) + (E_{RA} + E_Y)}$$

Multiplying through by $n$:

$$\frac{E_F}{E_B} = \frac{(E_{RA}+E_Y)}{(E_{RA}+E_Y)+n(E_{RA}+E_Y)} = \frac{1}{1+n}$$

The controlled or feedback voltage is therefore solely dependent upon the back E. M. F. $E_B$ and therefore upon the speed of the armature, thus giving ideal compensation of the feedback voltage during dynamic braking, providing the dynamic braking relay is infinitely sensitive. Since the relay cannot in practice be infinitely sensitive, the resistance of the series resistor 37 is preferably made larger than necessary and the resistor is provided with an adjustable tapping.

This is illustrated by Fig. 2, in which the resistor 37 of Figs. 1 and 4 is replaced by the portion of the resistor 53 between its terminal 95 and its adjustable tapping 102.

The arrangement of Fig. 2 also differs from the arrangement of Fig. 1 inasmuch as, during regular operation, the converter 1 supplied power to the armature through series resistor 53. The feedback resistor 82 is connected across the armature 2 and across the portion of the series resistor 53 which lies between terminal 95 and tapping 84. It may be shown that if the tapping 84 is suitably adjusted, the controlled or feedback voltage between terminals 95 and 81 is proportional to the back E. M. F. of the armature, regardless of how much current the converter 1 is delivering to the armature 2. It may further be shown by a diagram similar to Fig. 4 that if the tapping points 84 and 102 are made to coincide at a point such that the resistance between said point and terminal 95 is $$\frac{1}{n}$$

of the internal armature resistance, where $n$ is the ratio of the potential divider 82, then the feedback voltage between terminal 95 and tapping 81 is equal to $$\frac{1}{1+n}$$

of the back E. M. F., regardless of whether the motor is supplying power to the braking resistor 32 or the converter 1 is supplying power to the motor. If the dynamic braking relay winding 12 and the control winding 10 were infinitely sensitive, the dynamic braking would be accurately compensated as previously described, and also the motor would run at a constant speed regardless of its load during normal operation. In Fig. 4, however, the tappings 102 and 84 have been shown as independently adjustable to allow for the finite sensitivity of the relay winding 12 and of the control winding 10 respectively, so that said tappings may be adjusted in pratice to give perfect compensation during dynamic braking and also perfect speed regulation during regular operation.

Figure 5:
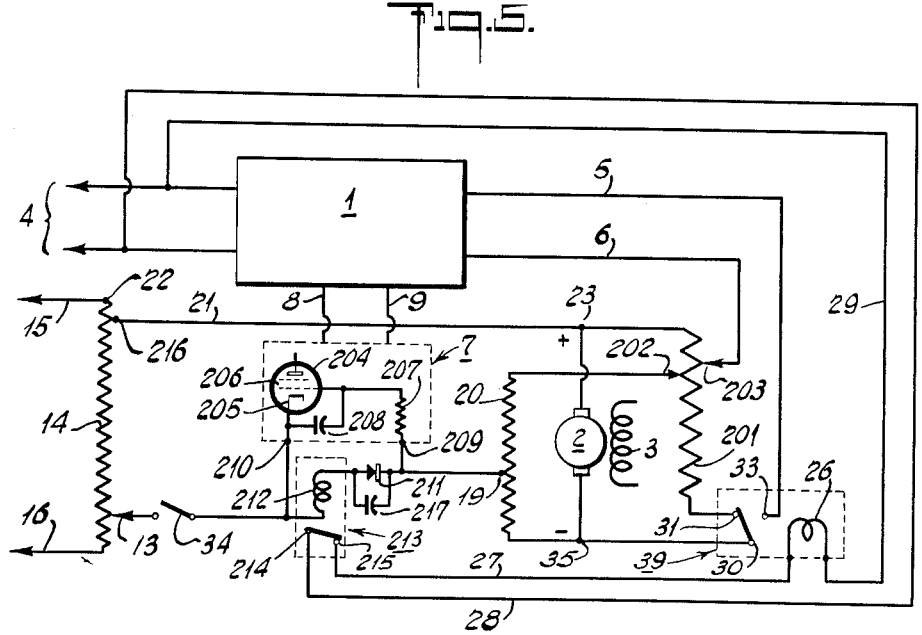
Figure 5 is a schematic circuit diagram of another form of the invention.

Fig. 5 is a schematic circuit diagram of an alternative arrangement in which the controlled voltage fed back is derived from a potential divider which is connected across the armature and across a part of the dynamic braking resistor; also, the control device in Fig. 5 includes a vacuum tube. Many of the elements are similar to those of Fig. 1 and these have been similarly numbered, and their description will not be repeated.

In Fig. 5 however, 201 is the dynamic braking resistor, and it is provided with tappings 202 and 203. The potential divider 20 is connected between negative armature terminal 35 and tapping 202; the tapping 202 is electrically equivalent to the terminal 36 of Fig. 1 and Fig. 4 and the upper portion of the dynamic braking resistor between tapping 202 and terminal 23 is electrically equivalent to the series resistor 37 of Fig. 1 and Fig. 4, during dynamic braking conditions. Accordingly, the position of tapping 202 may be adjusted to compensate for the effect of internal armature resistance during dynamic braking, as previously described.

The converter output conductor 6 is connected to another tapping 203 on the dynamic braking resistor and the position of tapping 203 may be adjusted to compensate at least partially for the effect of internal armature resistance during regular operation.

The control device 7 includes a vacuum tube 204, having a cathode 205, a control grid 206, and other electrodes which are connected through control circuits which have been described in the prior art, in such a way that the output of converter 1 is controlled, through conductors 8 and 9 in accordance with a D. C. signal voltage applied between the cathode 205 and grid 206.

Since the circuit details within the control device 7 do not constitute the present invention, their description has been omitted, for simplicity. However, the vacuum tube 204 may be connected as a reactance tube in a phase shifting network generally as described in U. S. Patent 2,524,759 with reference to Fig. 9, or in U. S. Patent 2,524,760 with reference to Fig. 8, or in U. S. Patent 2,524,761 with reference to Fig. 8, or in U. S. Patent 2,524,762 with reference to Fig. 12. Alternatively, the vacuum tube 204 may be connected as an amplifier to control the output of converter 1 by other methods known in the prior art.

In any of these arrangements referred to, the output of the converter 1 may be reduced to zero, or to its minimum value, by applying a sufficiently high negative biasing voltage to the grid 206 in relation to the cathode 205. It is usually necessary to filter the asymmetric signal voltage to reduce the ripple in the grid voltage, for instance by resistor 207 connected in series with the grid, and condenser 208 connected between grid 206 and cathode 205; the resistor 207 and the cathode 205 are connected to control terminals 209, 210 respectively, which are connected in the signal circuit between tappings 19 and 31 on potential dividers 20 and 14.

Since the impedance looking into the control terminals 209, 210, is in this arrangement very high, the winding 212 of relay 213 is connected, in series with rectifier 211, in the signal circuit, but in parallel with the control terminals 209, 210. Furthermore, since the effect of reducing the negative controlling voltage between terminal 23 and tapping 13 is to increase the negative grid bias at control terminal 209 with respect to terminal 210, and thereby to reduce the output of converter 1, the rectifier 211 is polarized so as to pass current from left to right, and the relay 213 is provided with contacts 214, 215, which are "normally closed," in other words they are opened to connect the braking resistor 201 across the armature 2 only when the relay winding 212 is energized by a sufficient increase in the negative bias across control terminals 209, 210. A condenser 217 is preferably connected across rectifier 211 to reduce the ripple in the signal voltage and to steepen the rectifier cutoff, when said voltage reverses.

Fig. 5 also differs from Fig. 1 inasmuch as the positive armature terminal 23 is connected, through conductor 21, to an intermediate tap 216 on potentiometer 14, so that when slider 13 is moved to the upper end 22 of potentiometer 14 it applies a positive biasing voltage to the cathode 205, which is equivalent to applying a negative bias to the grid 206 for the purpose of stopping the motor or running it at a very low speed.

Figure 6:
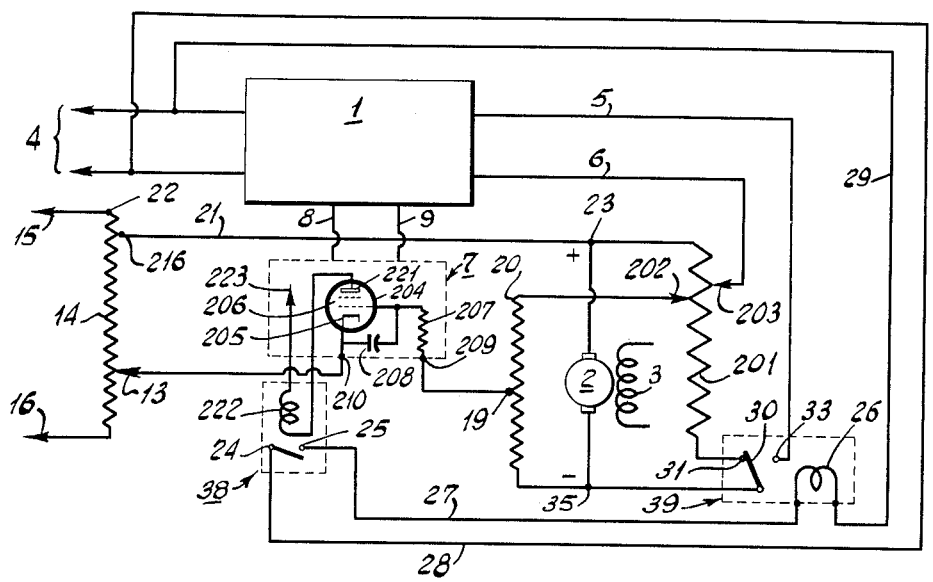
Figure 6 is a schematic circuit diagram of yet another form of the invention.

Fig. 6 shows another alternative arrangement, in which the control device includes a vacuum tube, and the dynamic braking relay is connected in the plate circuit of the vacuum tube. Most of the elements are similar to those of Figs. 1 and 5 and are similarly numbered. However, the winding 222 of the dynamic braking relay 38 is connected between the plate 221 of vacuum tube 204 and the conductor 223 which is connected to the control circuit for controlling the output of converter 1. Since the effort of reducing the negative controlling voltage between terminal 23 and tapping 13 is to reduce the plate current in order to reduce the converter output, the relay 38 has "normally open" contacts 24 and 25, as in Fig. 1, so that said contacts are opened and the braking resistor 201 is connected across the armature 2 when there is a sufficiently sharp reduction of said controlling voltage.

In each of the drawings, Figs. 1, 2, 5 and 6, the braking contacts 30 and 31 of the contactor 39 have been shown as "normally closed," and the output contacts 30 and 33 have been shown as "normally open" (when the contactor is de-energized). It will be appreciated that alternative, but equivalent arrangements may be used in which the braking contacts are "normally open," and the output contacts are "normally closed," providing that the "contact sense" of the dynamic braking relay is also reversed; in Figs. 1, 2 and 6, the relay contacts 24 and 25 would then be "normally closed," while in Fig. 5, the relay contacts 214, 215 would be "normally open."

It will also be appreciated that in all the drawings except Fig. 2, the converter 1 has been shown in schematic form, as the converter itself is not a part of the invention. The converter may, in fact, be of any kind which will deliver a non-reversible output which can be continuously controlled by a signal applied to the control device 7, and the converter may in particular comprise a grid-controlled gas or vapor or vacuum discharge device or devices or a magnetic amplifier.

This motor is shown for simplicity, in all the drawings, as having an armature and a shunt field winding only. However, in practice, the motor may also have additional series field winding for the purpose of improving commutation, and for stabilizing and compounding purposes. Such additional windings have been omitted from the drawings for simplicity, but it should be understood that such windings may be included, either between the armature and the armature terminals as shown in the drawings and defined in the claims, or alternatively they may be included in the circuit outside of the armature terminals, according to the best arrangement as determined by calculation or experiment.

I claim:

1. In a control system for an electric motor including a controllable converter for supplying the armature, and a signal circuit including a control device for said converter and a source of reference voltage, the combination of a dynamic braking resistive circuit connected from a first terminal of said armature to a second terminal of said armature through a pair of contacts and having an intermediate point on said resistive circuit, a potential divider connected from said intermediate point to said second armature terminal and having a tapping thereon connected to said signal circuit, to supply to the signal circuit a voltage substantially proportional to the back E. M. F. of the armature, a connection from said signal circuit to said source, a connection between said source and an armature terminal, a relay arranged to open and close said contacts in accordance with the energization of said signal circuit by a voltage which is substantially independent of the resistive drop in the armature circuit during the dynamic braking period, and connections for energizing said armature from said converter.

2. In a control system for an electric motor including a controllable converter for supplying the armature, the combination of a source of reference voltage connected between a first terminal of said armature and a reference voltage terminal, a dynamic braking resistive circuit connected from said first terminal of said armature to a second terminal of said armature through a pair of contacts and having an intermediate point on said resistive circuit, a potential divider connected from said intermediate point to said second armature terminal and having a tapping thereon, a signal circuit connected through a control device for said converter and connected between said tapping and said reference voltage terminal whereby a voltage dependent upon the back E. M. F. of the armature is supplied to said signal circuit, a relay arranged to open and close said contacts in accordance with the voltage across said signal circuit, said voltage being at least partially compensated for the impedance drop of the armature during the dynamic braking period, and connections for energizing said armature from said converter.

3. In a control system for a motor, including a controllable electric converter for supplying power to the armature, a signal circuit including a control device for said converter, and a source of reference voltage connected between a first terminal of said armature and a first terminal of said signal circuit, the combination of a dynamic braking resistive circuit connected from said first armature terminal to a second terminal of said armature through a pair of contacts and having an intermediate point on said resistive circuit, a potential divider connected from said intermediate point to said second terminal of said armature and having a tapping thereon connected to a second terminal of said signal circuit whereby said signal circuit is supplied with a voltage dependent upon the back E. M. F. of the armature, a relay arranged to open and close said contacts in accordance with the voltage between said first and second terminals of the signal circuit and connections for energizing said armature from said converter.

4. The combination in accordance with claim 1, in which means are provided to connect one output terminal of the converter to the second terminal of said armature and for connecting the other output terminal to an intermediate point on said resistive circuit.

5. The combination in accordance with claim 1, in which said two output terminals of the converter are connected to the two terminals of said armature through additional contact means which are closed when said first named pair of contacts is open and vice versa.

6. The combination in accordance with claim 1 in which additional contacts are provided to connect the output terminals of the converter between the second terminal of said armature and an intermediate point on said resistive circuit, said additional contacts being closed when said first named pair of contacts is open and vice versa.

7. In a control system for a motor, including a controllable electric converter for supplying the armature, and a signal circuit including a control device for said converter, the combination of a first resistor connected in series with said armature and said converter, a source of reference voltage connected between a point on said first resistor and a first terminal of said signal circuit, a second resistor connected in parallel with said armature and at least a part of said first resistor and having a tapping thereon connected to a second terminal of said signal circuit, a relay arranged for energization by said signal circuit, a pair of contacts operated in accordance with said energization, and a third resistor connected in series with said pair of contacts across the armature and at least a part of said first resistor whereby said motor is dynamically braked and controlled by the back E. M. F. of said armature substantially free of any impedance drop in said armature.

8. In an electric motor control system, including a controllable converter with connections for supplying the motor armature, and a signal circuit including a control device for said converter, the combination of a first resistor, a source of reference voltage connected between a point on said first resistor and a first terminal of said signal circuit, a second resistor in series with the first resistor, contacts to connect said resistors in series across the armature to dynamically brake the motor, a relay for operating said contacts, a third resistor connected in parallel with the first resistor through said contacts, a tap on the third resistor connected to a second terminal of the signal circuit, whereby the voltage from said tap on the third resistor is controlled by the back E. M. F. of the armature, at least partially compensated for the impedance drop of said armature, and means under control of said signal circuit for operating the relay.

9. A combination in accordance with claim 8 including at least one additional contact engageable by said contactor to connect the armature across the converter when said relay is inoperative.

10. The combination in accordance with claim 1, in which the control device includes a control winding connected in series with a winding of said relay and with a rectifier, in said signal circuit.

11. A combination in accordance with claim 1, in which said control device includes a reactor having a saturable core, at least one A. C. winding and a D. C. control winding, said control winding being connected in series with the winding of said relay and with a rectifier in the signal circuit, the A. C. windings being arranged to control the output of said converter.

12. A combination in accordance with claim 1, in which the control device includes a vacuum tube having control electrodes which are connected in the signal circuit, while the winding of said relay is connected in series with a rectifier across a part of the signal circuit which includes said control electrodes.

13. A combination in accordance with claim 1, in which the control device includes a vacuum tube having control electrodes connected in the signal circuit, and having a current-carrying electrode connected in a circuit including the winding of said relay.

14. In an electric motor control system, including a controllable converter for supplying the motor armature, and a signal circuit including a control device for said converter, the combination of a tapped dynamic braking resistor, contacts for connecting said tapped resistor across the armature, a potential divider connected between a tapping on said tapped resistor and an armature terminal, said potential divider having a tapping connected to said signal circuit and means for connecting two output terminals of the converter to a tapping on said tapped resistor, and to an armature terminal respectively.

15. The combination in accordance with claim 7, in which the output of the converter is connected to the armature through additional contact means which are closed when said first named pair of contacts is open and vice versa.

16. The combination in accordance with claim 7, in which the control device includes a control winding connected in series with a winding of said relay and with a rectifier, in said signal circuit.

17. A combination in accordance with claim 7, in which said control device includes a reactor having a saturable core, at least one A. C. winding and a D. C. control winding, said control winding being connected in series with the winding of said relay and with a rectifier in the signal circuit, the A. C. windings being arranged to control the output of said converter.

18. A combination in accordance with claim 7, in which the control device includes a vacuum tube having control electrodes which are connected in the signal circuit, while the winding of said relay is connected in series with a rectifier across a part of the signal circuit which includes said control electrodes.

19. A combination in accordance with claim 7, in which the control device includes a vacuum tube having control electrodes connected in the signal circuit, and having a current-carrying electrode connected in a circuit including the winding of said relay.

20. In an electrical motor control system, including a controllable converter for supplying the motor armature, and a signal circuit including a control device for said converter, the combination of a first resistor less than the whole of which is in series with said armature, a second resistor connected to said first resistor and an armature terminal and having a tapping connected to said signal circuit, contacts to connect the whole of said first resistor in series across the armature, a relay for operating said contacts, and means under control of said signal circuit for operating the relay.

References Cited in the file of this patent

UNITED STATES PATENTS

| 2,190,523 | Rogers et al. | Feb. 13, 1940 |
| 2,551,357 | White | May 1, 1951 |
| 2,600,003 | Knauth et al. | June 10, 1952 |

FOREIGN PATENTS

| 580,005 | Great Britain | Aug. 23, 1946 |
| 624,937 | Great Britain | June 20, 1949 |